United States Patent [19]
Dee

[11] Patent Number: 5,408,740
[45] Date of Patent: Apr. 25, 1995

[54] FIREWALL FEED-THROUGH CONNECTOR FOR EMERGENCY SERVICE

[75] Inventor: James S. Dee, Brea, Calif.
[73] Assignee: J-Tech
[21] Appl. No.: 38,669
[22] Filed: Mar. 26, 1993
[51] Int. Cl.⁶ .............................................. H01B 19/00
[52] U.S. Cl. .................... 29/631; 174/65 R; 174/152 R
[58] Field of Search ............... 29/631, 856, 858, 825; 174/65 R, 152 R

[56] References Cited

U.S. PATENT DOCUMENTS 3,130,260  4/1964  Gray ................................ 174/152 R

FOREIGN PATENT DOCUMENTS 54-46394  4/1979  Japan ................................ 174/65 R Primary Examiner—Carl J. Arbes
Attorney, Agent, or Firm—Hawes & Fischer

[57] ABSTRACT

The firewall feed-through adapter of the present invention, and method for making, is an assembly utilizing an aluminum oxide insulator which is specially machined to interfit with the outer insulation of the conductors. The firewall shell is specially designed to compress the insulator about the conductors and their wire insulation to insure a complete sealing of the firewall side of the adapter. The shell of the adapter is machined both to reduce the labor involved in its manufacture, as well as to provide an internal frusto-conic surface which is used to compress the insulation about the conductors and their wire insulation. The action of securing the shell to the back plate simultaneously seals the shell against the firewall while sealing the insulation against the conductors and the inner surfaces of the shell. An improved method for manufacturing the adapter of the present invention, and particularly the manufacture of the insulator portion of the adapter, insures a good seal about the wire insulation of the conductors. The adapter of the present invention not only meets, but clearly exceeds the 2000° Fahrenheit temperature test.

4 Claims, 2 Drawing Sheets

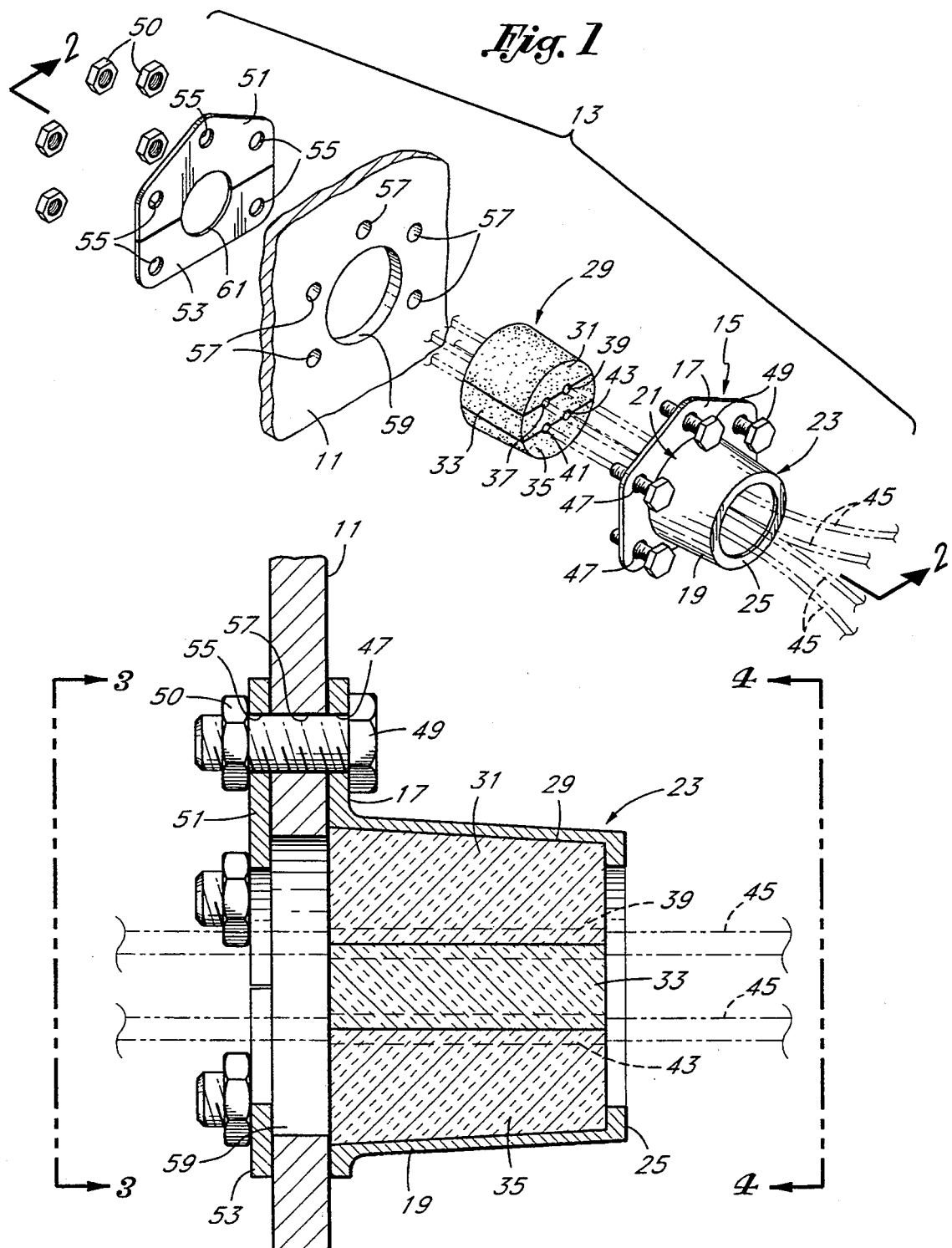

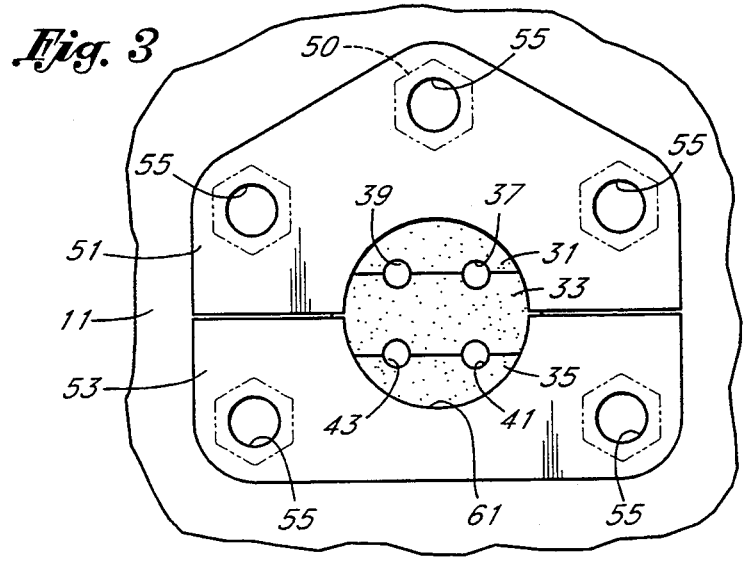
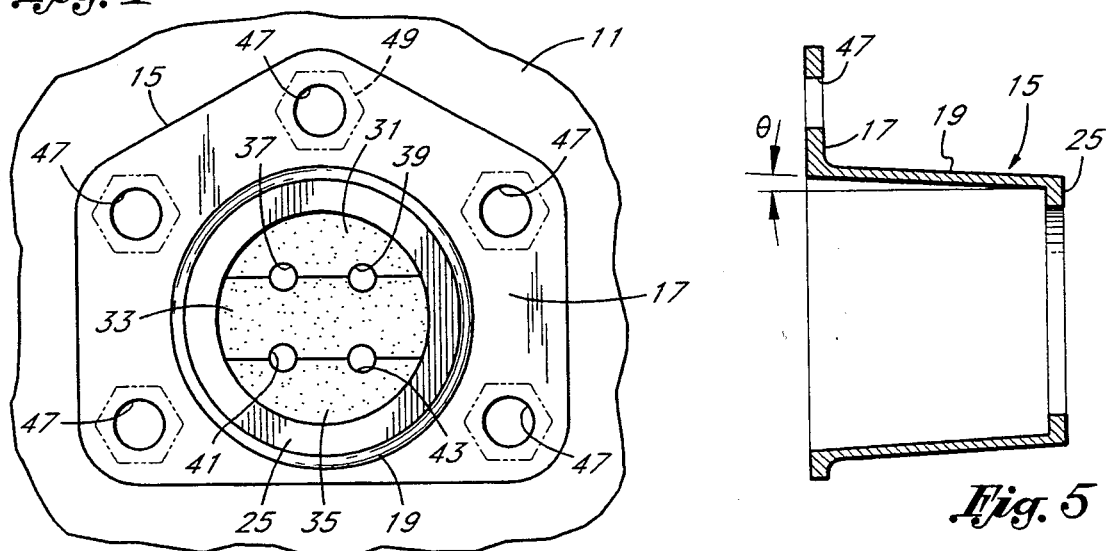
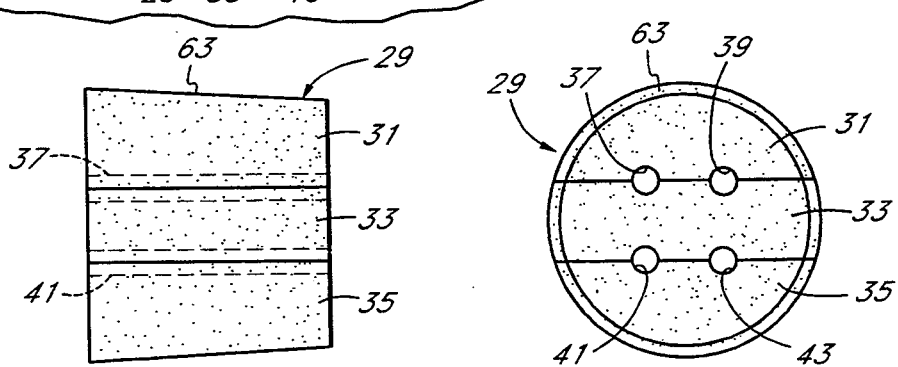

FIREWALL FEED-THROUGH CONNECTOR FOR EMERGENCY SERVICE

FIELD OF THE INVENTION

The present invention relates to the field of electrical connectors and structures which physically support the extension of electrical conductors across boundaries into areas which may experience harsh conditions. More specifically, the present invention relates to a feed-through connector and method useful in applications where high temperatures can be sustained for significant amounts of time, especially useful for routing backup systems which must be made as fail safe as possible, and where it is desirable to service and re-assemble the connector even if a high temperature condition has occurred. The invention also relates to an inexpensive advantageous method for making such a feed-through adapter and its insulator as well as a method for installing the adapter.

BACKGROUND OF THE INVENTION

Electrical connectors and adapters are used in a wide variety of applications in industry, and differ in shape, size and characteristics depending upon the types of service in which they are employed. In instances where wiring for emergency or backup systems are involved, electrical connectors cannot be employed with any reasonable expectation of reliability under the harsh conditions accompanying the emergency or back-up condition in which it must provide electrical service. This is because the use of the emergency or backup system will occur under conditions so extreme that the use of a standard service connector would cause failure. In these instances an adapter is utilized with the electrical conductors passing un-interrupted through the adapter.

This is especially so where the adapter is directly exposed to the hazardous condition. In the case of an aircraft firewall, the insulated side of the adapter may be exposed to physical contact from debris, as well as extremes in pressure and temperature. When the firewall is adjacent an engine compartment, it can be expected that the temperatures can quickly rise to high levels, that the pressure on the adapter can build, and that debris may strike the adapter.

The emergency and backup electrical services which typically extend into an engine compartment include the engine fire extinguisher actuator and possibly the engine thrust reversing actuators. The purpose of the adapter is to keep the wires undamaged and insulated at the point where they extend across the boundary and into the high temperature area. Since the adapter is designed for emergency and back-up systems, it must function to keep the conductors in-tact under the particular emergency conditions for which the emergency equipment will be needed.

Another consideration for an adapter is the degree to which the cold side of the firewall is isolated from hot gasses. Even if the adapter does not fail in the sense that the conductors do not fail, a failure which allows hot, perhaps toxic fumes to leave the containment area on the hot side of the firewall is unacceptable. Many adapters are designed to protect the integrity of the wires passing therethrough without regard to truly isolating and sealing the area on the hot side of the firewall.

To insure that a given adapter will withstand such emergency conditions, a test has been devised which an adapter must pass to be found acceptable for emergency service. The test subjects the adapter to a temperature of 2000° Fahrenheit for 15 minutes. The test is performed by using a burner which is lit and allowed to achieve the 2000° Fahrenheit temperature measured by the flame heating of a thermocouple. As soon as the 2000° temperature is attained, the burner is placed in front of the adapter at a distance of four inches from the adapter, and elapsed time is recorded while the adapter is observed for failure.

For example, one such adapter utilized a back plate on the reverse side of a firewall along with a nextel ceramic fiber gasket on the "hot" side of the firewall, followed by an inconel plate, a cylindrical, soft silicone insert, a ceramic insulator plate abutting the end of the cylindrical soft insulator, and finally a cylindrical inconel weldment surrounding the soft silicone and ceramic insulator plate. The inconel weldment consisted of a plate portion welded to a cylindrical portion which was welded to a ring. The plate portion of the inconel weldment was bolted to the inconel plate located on the back side or "cold" side of the firewall.

This configuration was only able to with stand three minutes of the 2000° Fahrenheit flame test. Further, this failing configuration, not including bolts and washers, required eight pieces of hardware and significant labor involved in welding the inconel weldment. This configuration also carried the conductors in a horizontal row, as did the inconel plate on the cold side of the firewall, the ceramic fiber gasket, the inconel plate on the hot side of the firewall and the silicone and ceramic insulators. The conductors were lined up horizontally across the circular cross section of the silicone insulator and were therefore not evenly spaced with respect to other conductors or the edges of the adapter.

Since adapters are used in bulk numbers and in a variety of services, their performance and resources required for production and installation are an important aspect of their use and acceptance. A single aircraft may require hundreds of such adapters of various sizes to adequately protect the various back-up and emergency systems of the aircraft. Aside from the resources required for production, the labor resources required for installation and replacement also represent a major resource expenditure. The time required to assemble even one less piece of hardware is significant when considering the multiplier effect arising from the use of hundreds and thousands of the adapters over the course of time.

What is therefore needed is an adapter having a number of salient characteristics which improve its performance and reduce the resources expended to achieve such performance. The ideal adapter should have a lesser number of parts, will be amenable to more simplified manufacture, and be made of superior materials. The ideal adapter will be easy to install quickly and will be completely serviceable. Further, the ideal adapter will not only pass, but exceed the 2000° Fahrenheit flame test outlined above and provide a complete seal off of the hot side of a firewall. Such sealing should especially be accomplished about the insulated conductors to prevent degradation of the insulation to the maximum extent practicable under emergency conditions.

SUMMARY OF THE INVENTION

The firewall feed-through adapter for emergency service of the present invention is a six piece assembly utilizing an aluminum oxide insulator having internal surfaces specially machined to interfit with the outer insulation of the conductors, also known as wire insulation. The firewall shell is specially designed to compress the adapter's insulator about the electrical conductors and their wire insulation to insure a complete sealing of the firewall side of the adapter. The shell of the adapter may be machined from a single piece of material both to reduce the labor involved in its manufacture, as well as to provide an internal frusto-conic surface which is used to compress the adapter's insulator about the conductors and their wire insulation after the adapter is installed. With the configuration of the adapter of the present invention, the action of securing the shell to the back plate simultaneously seals the shell against the firewall while sealing the adapter insulator inwardly against the conductors and outwardly against the inner surfaces of the shell. An improved method for manufacturing the adapter of the present invention, and particularly the manufacture of the insulator portion of the adapter, insures a good seal about the wire insulation of the conductors. The adapter of the present invention not only meets, but clearly exceeds the 2000° Fahrenheit temperature test.

BRIEF DESCRIPTION OF THE DRAWINGS

FIG. 1 is a perspective view of the adapter of the present invention shown attached to a firewall;

FIG. 2 is a side sectional view taken along line 2—2 of FIG. 1;

FIG. 3 is a rear view of the adapter of FIGS. 1 and 2 and illustrating the upper and lower back plates of the adapter of FIGS. 1 and 2;

FIG. 4 is a front view of the adapter of FIGS. 1 and 2;

FIG. 5 is a side sectional view of the shell of the adapter taken along line 2—2 of FIG. 1 but without the insulator, and which illustrates the frusto-conic shape of a portion of its internal surface;

FIG. 6 is a plan view of the insulator portion of the adapter which was shown in FIGS. 1-4; and FIG. 7 is a side view of the insulator portion of the adapter which was shown in FIGS. 1-4 and 6.

DETAILED DESCRIPTION OF THE PREFERRED EMBODIMENT

The description and operation of the invention will be best begun with reference to FIG. 1. A firewall 11 is a separating structure as often naturally occurs on aircraft or industrial facilities and which is used to isolate a potentially hazardous area from other areas. Centrally located with respect to FIG. 1 is the adapter 13. Adapter 13 has a shell 15 which includes a plate portion 17 and a somewhat cylindrical appearing open ended portion 19. The open ended portion 19 arises from the plate portion 17 in a curved fashion at curved portion 21. In one embodiment the curve has a radius of curvature of 0.030 inches in order to provide a smooth, structurally stable transition. The opposite side of the curved portion 21 may also provide a smooth transition from the back side of the plate portion 17 into the open ended portion 19.

Open ended portion 19 has a gentle internal taper extending from the curved portion 21 outwardly to an end 23 of open ended portion 19. Thus, the internal surface of the open ended portion 19 has the shape of a frusto-conic section. In the adapter 13 of the present invention, the open ended portion 19 has a frusto-conic shape on both the internal and external surfaces. However, it is not necessary that both surfaces have the frusto-conic shape, only the internal surface need have a frusto-conic, or similar surface. End 23 has a flat annular surface 25 having an outer circumference which is continuous with the open ended portion 19, and an inner circumference. The inner circumference serves as a stop and a limit for an insulator 29. Insulator 29 is in fact made up of an upper section 31, a middle section 33 and a lower section 35. The boundary between the upper section 31 and the middle section 33 forms a pair of spaced apart openings 37 and 39. Likewise, the boundary between the lower section 35 and the middle section 33 forms a pair of spaced apart openings 41 and 43. An electrical conductor 45 extends from each of the openings 37, 39, 41, and 43.

The shell 15 and its open ended portion 19 and plate portion 17 may be manufactured by machining it from a solid piece of material. This technique is generally more cost effective than starting with a plate portion 17 and welding on a open ended portion 19 and a flat annular plate to form the flat annular surface 25.

The periphery of the plate portion 17 of adapter 13 has a series of bolt holes 47 for enabling engagement of the shell 15 to firewall 11, as will be later shown in detail. In one position, a bolt 49 is shown in place within a bolt hole 47. Note the overall shape of the shell 15 of adapter 13. The bolt holes 47 are spaced about the periphery of the plate portion 17 at angular spacings of 60°. However, one of the bolt holes 47 of what would be a hexagonal pattern has been removed, and the associated material of the plate portion 17 removed, in order to enable the adapter 13 to fit onto a portion of the firewall 11 bounded by an obstruction. It is clear that the adapter 13 can be made in a configuration where the periphery of the plate portion 17 is hexagonal, or indeed where other positions of hexagonal hole placement have been removed to enable the adapter 13 to fit closely adjacent other obstructions. Such obstructions may include side walls, ceilings, floors, or other adapters or other connectors and fittings. As more than one bolt hole 47 is eliminated, it is contemplated that adjustments to the shape, such as by eliminating more bolt holes 47 and their associated surrounding material. In this case it may perhaps be desirable to add a slight curvature to the plate portion 17 between existing bolt holes 47 to form a springing fit against the firewall 11, as well as other modifications which may be needed to be made to insure a good sealing fit of the shell 15 against the firewall 11 where the plate portion 17 has a different shape.

Referring to FIG. 2, a side sectional view taken along line 2—2 of FIG. 1 illustrates further details of the adapter 13. Adjacent the firewall 11, on the side opposite to that which the shell 15 is attached, is an upper back plate 51 and a lower back plate 53. It is understood that the shape of the back plates 51 and 53 will generally, but not necessarily match the shape of plate portion 17, and will have bolt holes 55 (only one of which is shown) matching and aligning with the bolt holes 47 of the shell 15. It is also understood that a single back plate may be used instead of upper back plate 51 and lower back plate 53. Note that the firewall 11 is fitted with apertures 57 (only one of which is shown in FIG.

2) to accommodate the alignment of the bolt holes 55 and the bolt holes 47 to permit the bolt 49 to extend therethrough. Here bolt 49 is shown engaged with a nut 50. Firewall 11 is also fitted with a central aperture 59 to accommodate the electrical conductors 45 in their extension past the back plates 51 and 53 and through to the shell 15. Within the open ended portion 19 of the shell 15 is the insulator 29, including upper section 31, a middle section 33, and lower section 35. Note at the end 23 that the flat annular surface 25 captures the insulator 29 material, the flat annular surface 25 acting to further axially engage the insulating material at the front side of shell 15.

Referring to FIG. 3, a more complete spatial view of the back plates 51 and 53 are illustrated. The other bolt holes 55, in both the upper back plate 51 and the lower back plate 53 can be seen. The junction of the upper back plate 51 and the lower back plate 53 define a back plate aperture 61 through which the conductors 45 (which are not shown in FIG. 4) will extend. Back plate aperture 61 overlies the somewhat larger central aperture 59 of firewall 11.

Referring to FIGS. 1-3, in one embodiment of the adapter 13, this back plate aperture 61 had a diameter of about two-thirds of the maximum internal diameter of the open ended portion 19 of the shell 15, although it is understood that the sizes of these structures will vary depending upon the type of application to which they are applied. The central aperture 59 should be smaller than the maximum internal diameter of the open ended portion 19 of the shell 15 in order to trap the large end of the insulator 29 opposite the end of the insulator 29 which abuts flat annular surface 25, thus enabling limited compression of the insulator 29. FIG. 3 also illustrates the spaced apart openings 37, 39, 41, and 43.

Referring to FIG. 4, a front view of the adapter 13 of the present invention more clearly shows the open ended portion 19, the flat annular surface 25, and the flat portion 17. Exposed within the innermost diameter of flat annular surface 25 is the end of the insulator 29.

FIG. 4 also illustrates the spaced apart openings 37, 39, 41, and 43. These openings bear a particular relationship with respect to the outer diameter of the conductors 45 (not shown in FIG. 4) they will surround. Electrical conductors 45 are contemplated to be metal conducting material surrounded by some sort of insulation, usually a plastic or other organic based material, such as standard wire insulation which surrounds commercially available insulated electrical conductors. For example, an adapter 13 made for standard copper wiring having an outer diameter of from 0.130 to 0.132 inches in diameter would interfit into spaced apart openings 37, 39, 41, and 43 which have a smaller nominal diameter, in this instance from about 0.126 to 0.127 inches in diameter. In this case, the result is an interference fit of slightly less than about five thousandths of an inch. An interference fit of about five thousandths of an inch is generally desirable.

When making larger or smaller adapters 13, or when accommodating larger or smaller electrical conductors 45 with the same adapter 13, the ratio of the smaller opening diameter to the larger electrical conductor diameter will hold. This ratio of opening diameter to electrical conductor outside diameter in this isolated example is 0.9656. Based upon the limits of the nominal values given, and for like materials, this ratio may fluctuate between 0.9545 and 0.9769. This ratio may also vary based upon the type of wire insulation used on electrical conductor 45.

A less dense wire insulation on electrical conductor 45 would enable greater compression of the wire insulation on electrical conductor 45, and the permissible working ratio of opening diameter to electrical conductor outside diameter would be expected to decrease. Likewise, a more dense, harder wire insulation on electrical conductor 45 would enable less compression on the wire insulation on electrical conductor 45, and the permissible working ratio of opening diameter to electrical conductor outside diameter would be expected to increase.

In applications where the conductors are such that significant pressure on the outside wire insulation would cause failure, an increased ratio would be employed to avoid electrical conductor 45 damage. The manner of forming the spaced apart openings 37, 39, 41, and 43 will be discussed in detail with respect to FIGS. 6 and 7.

Referring to FIG. 5, a side view of the shell 15 without the presence of insulator 29 enables the illustration of the angularity of the open ended portion 19. The open ended portion 19 will generally have a constant conic half angle $\theta$ with regard to a line extending through the axis of the open ended portion 19. This half angle $\theta$ may vary depending upon the service in which the adapter 13 is placed, and upon the axial pressure to be applied to the insulator 29.

Nominally a half angle $\theta$ of about 3° has been found to work acceptably on one embodiment of the adapter. A half angle $\theta$ of more than 3°, such as about 6° would place more radially compressive force on the insulator 29 for each additional measure of force or displacement applied in the axial direction. A half angle $\theta$ of less than 3°, such as down to about 0.5° would place less radially compressive force on the insulator 29 for each additional measure of force or displacement applied in the axial direction, but would enable more radial force where a limited amount of force is available for displacing the insulator 29 in the axial direction. This is an important consideration since it has been shown that the diameters of the spaced apart openings 37, 39, 41, and 43 will be less than the outside diameter of the electrical conductors 45, and that the upper section 31, middle section 33, and lower section 35 will initially be somewhat spaced apart from each other upon initial engagement with the electrical conductor 45 and before the open ended portion 19 is moved axially over the insulator 29.

The variation of the half angle $\theta$ could be accomplished over a range of differing circumstances. For example where more than three sections corresponding to upper section 31, middle section 33, and lower section 35 will be used, a greater angle may be necessary to accommodate an initially expanded size insulator 29 (not shown in FIG. 5) before it is compressed by axial movement of the open ended portion 19. Similarly, in instances where the ratio of opening diameter to electrical conductor outside diameter is very small, a smaller half angle $\theta$ could be employed to facilitate the higher radial forces needed from a given amount of axial force which would normally be provided by an installer.

Referring to FIG. 6, an axial end view of the insulator 29, including the upper section 31, middle section 33, and lower section 35, looking into the end of insulator 29 which abuts the flat annular surface 25. A frustoconic outer surface 63 can be seen, which will face the inner surface of the open ended portion 19, once the adapter 13 is assembled in place upon the firewall 11.

Referring to FIG. 7, a side view of the insulator 29 of FIG. 6 best illustrates the frusto-conic profile of insulator 29. The spaced apart openings 37 and 41 are shown in dashed line format. The insulator 29 may be made of aluminum oxide, 99.5% which is presently commercially available from the Carborundum Company. The 99.5% relates to the percentage of aluminum oxide present in the commercially available product. Other characteristics of this commercially available material include its density, at 3.9; its hardness, at 1255; its compressive strength, at 325 kpsi; its porosity, gas tight; its thermal conductivity, at 1000° of about 6.4; and its volume resistivity at 700° of $1.6 \times 10^7$ Ohm-cm. Other characteristics of this material are well known, and need not be re-emphasized.

Other materials may be used as an insulator 29, so long as their performance meets the performance criteria required for the overall adapter 13. Aluminum oxide 99.5%, due to its hardness, represents some problems insofar as shaping the material is concerned. The inventive method herein removes the necessity to independently shape the outer surface 63 of the upper section 31, middle section 33, and lower section 35.

In the inventive process of forming the shapes of FIGS. 6 and 7, the starting materials may be three blocks of aluminum oxide 99.5%. With regard to FIGS. 6 and 7, the blocks will be chosen such that the middle block is as thick as middle section 33 while the upper and lower sections 31 and 35 will be thicker so that enough material will be available to form the outermost curved portions of the upper and lower sections 31 and 35. Alternatively, a single block of aluminum oxide 99.5% could serve as a starting material which would be cut into three blocks which could have their surfaces finished to arrive at blocks with the proper thickness.

Once the blocks are finished, a wax is applied to the surfaces of the blocks which will correspond to the interface between the upper and middle section 31 and 33, and between the middle and lower section 33 and 35. A wax which has been found useful in this regard is Crystal Bond Wax, a commercially available product. The wax is utilized in this instance much like a glue. Once the three aluminum oxide 99.5% blocks are wax bonded together to form a unit, the blocks may be cut and lathed at room temperature to the proper size. In this manner, the three block unit may be worked as a single block with particular attention paid to the shaping and finish of the outer surface 63, without regard to the spaced apart openings 37, 39, 41, and 43 which have not yet been formed.

Once the outside surface of insulator 29 is satisfactorily formed, the individual upper, middle and lower sections 31, 33, and 35 may be separated for further processing. One way to separate the blocks is by the even application of an amount of heat necessary to melt the wax. Alternatively, the wax may be dissolved with the use of a solvent. In either case, the individual upper, middle and lower sections 31, 33, and 35 are then cleaned to prepare for the formation of the spaced apart openings 37, 39, 41, and 43 which are formed by cutting a pair one-half radius grooves onto the opposing sides of the upper and middle sections 31 and 33, and onto the opposing sides of the middle and lower sections 33 and 35. Each set of opposing, one-half radius grooves formes a single one of the spaced apart openings 37, 39, 41, and 43.

Installation of the adapter 13 is a simplified process. Referring back to FIGS. 1-7, a technician installing the adapter 13 begins by forming the firewall central aperture 59 and the apertures 57 which correspond to the type and mounting position of the flat portion 17 of the shell 15 and the corresponding bolt holes 47 and which also corresponds to the upper and lower back plates 51 and 53 and their bolt holes 55.

Once the electrical conductors 55 are extended through the central aperture 59 and the central portion of shell 15, including the axial center of flat annular surface 25, the shell 15 is moved axially along the electrical conductors 45, which are preferably wire insulated, and toward the firewall 11. The lower section 35 of the insulator 29 is brought under the two lower electrical conductors 45 such that the one-half radius portions of the pair of spaced apart openings 41 and 43 engage the bottom areas of those two electrical conductors 45. Next, the middle section 33 of insulator 29 is brought to rest over the two lower electrical conductors 45 such that the one-half radius portions of the pair of spaced apart openings 41 and 43 on middle section 33 engage the top areas of those two electrical conductors 45 supported by the one-half radius portions of the pair of spaced apart openings 41 and 43, such that the middle section 33 rests atop the lower section 35.

Next, the middle section 33, while still pressing against the lower section 35, of the insulator 29 is brought under the two upper electrical conductors 45 such that the one-half radius portions of the pair of spaced apart openings 37 and 39 engage the bottom areas of those two electrical conductors 45. Next, the upper section 31 of insulator 29 is brought to rest over the two upper electrical conductors 45 such that the one-half radius portions of the pair of spaced apart openings 37 and 39 on middle section 33 engage the top areas of those two electrical conductors 45 supported by the one-half radius portions of the pair of spaced apart openings 37 and 39 such that the top section 31 rests atop the middle section 33.

With the insulator 29 thus loosely formed, the shell 15 is moved axially toward the insulator 29 with the smaller end of the frusto-conic outer surface 63 inserted into the inner surface of the larger end of the frusto-conic shaped internal surface of open ended portion 19 of shell 15. The insulator 29 may or may not yet fit axially to the fullest extent of the open ended portion 19 of the shell 15 under the influence of hand pressure.

The insulator 29/shell 15 assembly holding the electrical conductors 45 is then placed against the firewall 11. It is understood that in instances where the firewall 11 is particularly thin or subject to buckling that plate spacers may be utilized for greater structural integrity. The bolts 49 may be loosely inserted into the bolt holes 47 and through the firewall 11 apertures 57. At the opposite side of the firewall 11, the upper back plate 51 and the lower back plate 53 are axially placed over the ends of the bolts 49 which protrude through the firewall 11. Nuts 50, and perhaps washers (not shown) then engage the bolts 49, and are tightened to draw the shell 15 closer to the firewall 11. Since the central aperture 59 is smaller than the larger diameter end of the insulator 29, the insulator 29 will not pass through the firewall as the bolts 49 are tightened, but will be urged toward the inner portion of the flat annular surface 25, causing the upper, middle and lower sections 31, 33, and 35 of insulator 29 to compress, to in turn produce axially compressive forces on the electrical conductors 45 as the one-half radius portions of the spaced apart openings 37, 39, 41, and 43 are brought together.

As the bolts 49 are tightened to their full extent, the inner portion of the flat annular surface 25 will begin to bear against the end of the insulator 29 opposite the firewall 11, to form a tight seal between insulator 29 and inner surface of the flat angular surface 25, and the inner frusto-conic surface of open ended portion 19. Also sealed are the contact surfaces between the firewall 11 and insulator 29, as well as between the firewall 11 and the plate portion 17 of the shell 15.

Variations in the makeup of the adapter 13 may be employed to facilitate the uses thereof. For example, the exterior surface 63 of the insulator 29, and or the interior surface of the open ended portion 19 may be coated to facilitate axial movement between them. The shell 15 and back plates 51 and 53 may be made of any material, but a 300 series stainless steel has been found to work best in combination with the aluminum oxide 99.5% under conditions of high temperature. In sizes where the maximum dimension of the plate portion 17 is about 2.2 inches, the desired thickness of both the plate portion 17 and back plates 51 and 53 has been found to be about 0.080 inches. The bolts 49 should be selected to similarly withstand the conditions to which the adapter 13 will be exposed, as well as the force with which the adapter 13 will be secured. Further, the area of the flat annular surface 25 portion may be increase to increase the surface area which bears upon the insulator 29, or the flat annular surface 25 portion may be eliminated altogether if it is believed that the frusto-conic shape of the inner surface of open ended portion 19 is sufficient to contain the insulator 29.

The adapter 13 of the present invention was subjected to, and passed the 2000° Fahrenheit flame test for the required 15 minute interval. Once the 15 minute milestone was passed with no observable failure or degradation of the adapter 13, the adapter 13 was left under conditions of test for a full 25 minutes, with still no observable changes taking place. The test procedure was stopped after 25 minutes to conserve fuel, since no further changes were occurring.

Since the insulator 29 forms a gas tight seal with the structures of the shell 15, none of the hot gasses from the flame test were able to transmigrate through any part of the adapter 13 to damage the electrical conductors 45. As a result, the heat transfer mechanism from the shell 15 in the direction of the electrical conductors 45 is dependent upon the thermal conductivity of the aluminum oxide 99.5%. Further, any melting of the wire insulation of the electrical conductor 45 located just outside the insulator 29 will act to further seal the boundary areas around the spaced apart openings 37, 39, 41, and 43, to further block even very small amounts of hog gasses from entering the insulator 29. More importantly, the sealing effect acts to prevent oxygen from entering the spaced apart openings 37, 39, 41, and 43. In this way, the wire insulation surrounding the electrical conductors 45 will not be permanently damaged, even if certain portions are exposed to temperatures which would otherwise cause oxidation if oxygen were present.

Another requirement which the adapter 29 meets is the ability for servicing and repair after the occurrence of a hazardous event. Using the flame test as an example, the adapter 29, even after being subjected to the high temperatures can be serviced to provide new wiring by simply unbolting the shell 15 pushing the insulator 29 back out of the open ended portion 19, separating the upper section 31, middle section 33 and lower section 35, and then re-assembling the already existing portions of the adapter 13 as was outlined previously. The only materials to be replaced, if any, are the electrical conductors 45 which have been damaged during the event.

In cases where the electrical conductors 45 are also adequately shielded against high temperature, nothing need be replaced after an emergency event unless necessary to insure an integrity check of the system. For the adapter 13 which underwent the 2000° flame test, disassembly revealed no smoke damage or other evidence of heating on any of the internal structures, including the insulator 29 and the portions of the electrical conductors 45 encased by the insulator 29.

While the present invention has been described in terms of a particular embodiment for an adapter 13, one skilled in the art will realize that the structure and techniques of the present invention can be applied to many appliances. The present invention may be applied in any situation where an electrical conductor or other conduit crosses a boundary where protection is needed at the boundary against extreme heat or debris, and particularly where there is a requirement that the electrical conductors traverse a boundary without connective termination.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this significant contribution to the art.

What is claimed:

1. The process of forming an insulator having a circular cross section and openings extending therethrough, comprising the steps of:
   providing a plurality of sections of material each having at least one interface surface complimentary to an interface surface of another section of material;
   affixing the complimentary surfaces of the sections to each other to form a common block;
   shaping said common block into a desired form;
   removing said plurality of sections from each other;
   forming at least one, one-half radius groove completely across each of said complimentary surfaces such that when the complimentary surfaces of the sections are re-affixed to each other to form a common block, each of the one-half radius sections forms an opening extending completely through said common block.

2. The process of forming an insulator as recited in claim 1 wherein said shaping said common block into a desired form step is performed by shaping said common block into a frusto-conic section, and wherein said openings extend the length of said frusto-conic section.

3. The process of forming an insulator as recited in claim 1 wherein said affixing the complimentary surfaces of the sections to each other to form a common block is performed by applying a layer of wax to said complimentary surfaces and bringing said complimentary surfaces of the sections into contact with each other; and wherein said removing said plurality of sections from each other is performed by heating said common block to melt said wax.

4. The process of forming an adapter, including the method of forming an insulator as recited in claim 1, and further comprising the steps of:

machining, from a single block of material, a shell having a plate portion having a plurality of bolt holes and an open ended frusto-conic portion having a first end formed with said plate portion and a second end formed with a flat annular surface; and forming at least one back plate having bolt holes corresponding to the bolt holes of said plate portion.

* * * * *